(12) United States Patent
Battistella et al.

(10) Patent No.: US 10,186,929 B2
(45) Date of Patent: Jan. 22, 2019

(54) BRUSHLESS MOTOR

(71) Applicant: AMER S.P.A., Valdagno (IT)

(72) Inventors: Francesco Battistella, Valdagno (IT); Mirko Dalla Costa, Schio (IT)

(73) Assignee: AMER S.P.A., Valdagno (IT)

( * ) Notice: Subject to any disclaimer, the term of this patent is extended or adjusted under 35 U.S.C. 154(b) by 148 days.

(21) Appl. No.: 14/742,467

(22) Filed: Jun. 17, 2015

(65) Prior Publication Data
US 2015/0372558 A1 Dec. 24, 2015

(30) Foreign Application Priority Data

Jun. 24, 2014 (IT) .............................. PD2014A0163

(51) Int. Cl.
*H02K 5/22* (2006.01)
*H02K 5/15* (2006.01)
*H02K 11/33* (2016.01)

(52) U.S. Cl.
CPC .............. *H02K 5/225* (2013.01); *H02K 5/15* (2013.01); *H02K 11/33* (2016.01)

(58) Field of Classification Search
CPC .......... H02K 5/22; H02K 11/00; H02K 5/225; H02K 5/15; H02K 11/33
USPC ......................................................... 310/71
See application file for complete search history.

(56) References Cited

U.S. PATENT DOCUMENTS

| | | | | |
|---|---|---|---|---|
| 4,724,347 A * | 2/1988 | Reinhardt | ................. | H02K 9/00 310/216.114 |
| 6,317,332 B1 * | 11/2001 | Weber | ................. | B60R 16/0239 310/71 |
| 6,497,035 B1 * | 12/2002 | Ratliff | ..................... | G01B 7/003 174/117 F |
| 2009/0140585 A1 * | 6/2009 | Pant | ........................ | H02K 5/225 310/71 |
| 2011/0193433 A1 * | 8/2011 | Bohrer | .................... | H02K 3/522 310/71 |
| 2012/0080966 A1 | 4/2012 | Tang | | |
| 2012/0090910 A1 * | 4/2012 | Lang | ....................... | H02K 5/225 180/271 |
| 2013/0043742 A1 * | 2/2013 | Jang | ........................ | H02K 3/522 310/43 |

(Continued)

FOREIGN PATENT DOCUMENTS

| | | |
|---|---|---|
| DE | 4122529 A1 | 1/1993 |
| DE | 102005056209 A1 | 6/2007 |

(Continued)

OTHER PUBLICATIONS

European Search Report dated Nov. 10, 2016 re: Application No. EP 16 18 1616; pp. 1-7; citing: US 2009/140585 A1, WO 2010/135922 A1 and US 2012/080966 A1.

*Primary Examiner* — Naishadh Desai

(74) *Attorney, Agent, or Firm* — Cantor Colburn LLP

(57) ABSTRACT

A brushless motor having a casing for containing a stator body and for a rotor with a driving shaft, an exit cap with an outlet for the driving shaft and a closure cap. The closure cap includes an output for power cables and is disposed opposite the exit cap and supports an electronic board for controlling the brushless motor. The closure cap further includes a recess for containing the electronic control board, which is defined so as to be recessed in an axial direction with respect to the outer surface of the cap.

7 Claims, 8 Drawing Sheets

(56) References Cited

U.S. PATENT DOCUMENTS

2013/0342059 A1* 12/2013 Suzuki .................. H02K 7/116
   310/83
2015/0123501 A1*  5/2015 Jang ........................ H02K 5/08
   310/43
2015/0381009 A1* 12/2015 Anderson ................ H02K 5/15
   310/68 R

FOREIGN PATENT DOCUMENTS

| DE | 102009046192 A1 | 5/2011 |
| EP | 1947343 A1 | 7/2008 |
| WO | 2010135922 A1 | 12/2010 |

* cited by examiner

BRUSHLESS MOTOR

FIELD

The present disclosure relates to a brushless motor.

BACKGROUND

Conventional brushless motors typically include a casing for containing a stator body and a rotor with driving shaft, an exit cap with an outlet for said driving shaft and a closure cap, which is opposite said exit cap, which supports an electronic board for controlling the brushless motor and comprises an output for power cables.

Currently, the need is felt increasingly to have a brushless motor which is dimensionally compact, both axially and radially, and in which at the same time the electronic board is in a protected position that is easily accessible in case of repair or replacement.

In a known type of brushless motor, the electronic control board, usually an encoder, is arranged outside the cap, inside a protective hood that is extended externally to said cap in an axial direction.

This solution, though having the merit of allowing easy adjustment of the encoder, which is easily accessible by removing the hood, which is external to the cap, without having to disassemble the cap from the brushless motor proper, suffers the drawback that it increases significantly the axial space occupations of the motor and determines a single output for cables which is radial with respect to the motor, an arrangement that is a limitation for applications requiring a reduced radial space occupation.

In a further, different, type of brushless motor, in order to reduce axial space occupations the encoder is arranged inside the cap, fixed to an annular portion that extends from said cap and is coaxial to the rotation axis of the driving shaft, in a region located further inward than the bearings for the driving shaft on the side of said cap.

This arrangement of the encoder, while making the motor more compact axially, makes it impossible to access the encoder except by disassembling the cap, and this entails the loss of the protection degree and makes the operation of synchronization between the signal of the encoder and the rotor magnetic field more difficult; as is known, this synchronization is necessary for the operation of a brushless motor.

SUMMARY

The aim of the present disclosure is to provide a brushless motor capable of obviating the cited limitations of the background art.

Within this aim, an object of the disclosure is to provide a brushless motor capable of combining compactness and ease of access to an electronic control board.

A further object of the disclosure is to provide a brushless motor that is simpler to assemble than the known brushless motors cited above.

Another object of the disclosure is to provide a brushless motor with a capacity and efficiency that are not lower than similar brushless motors of the known type.

This aim and these and other objects that will become better apparent hereinafter are achieved by a brushless motor, comprising a casing for containing a stator body and a rotor with a driving shaft, an exit cap with an outlet for said driving shaft and a closure cap, which is opposite said exit cap and supports an electronic board for controlling the brushless motor and comprises an output for power cables, characterized in that said closure cap has a recess for containing said electronic control board, which is defined so as to be recessed in an axial direction with respect to the outer surface of said cap.

BRIEF DESCRIPTION OF THE FIGURES

Further characteristics and advantages of the disclosure will become better apparent from the description of a preferred but not exclusive embodiment of the brushless motor according to the disclosure, illustrated by way of non-limiting example in the accompanying drawings, wherein.

DETAILED DESCRIPTION OF THE FIGURES

Figure 1:
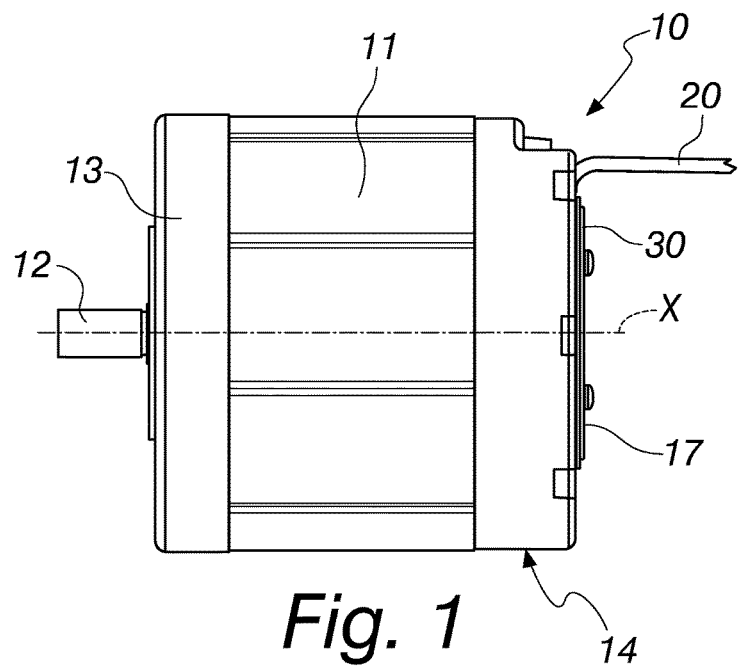
FIG. 1 is a side view of a brushless motor according to the disclosure.
Figure 2:
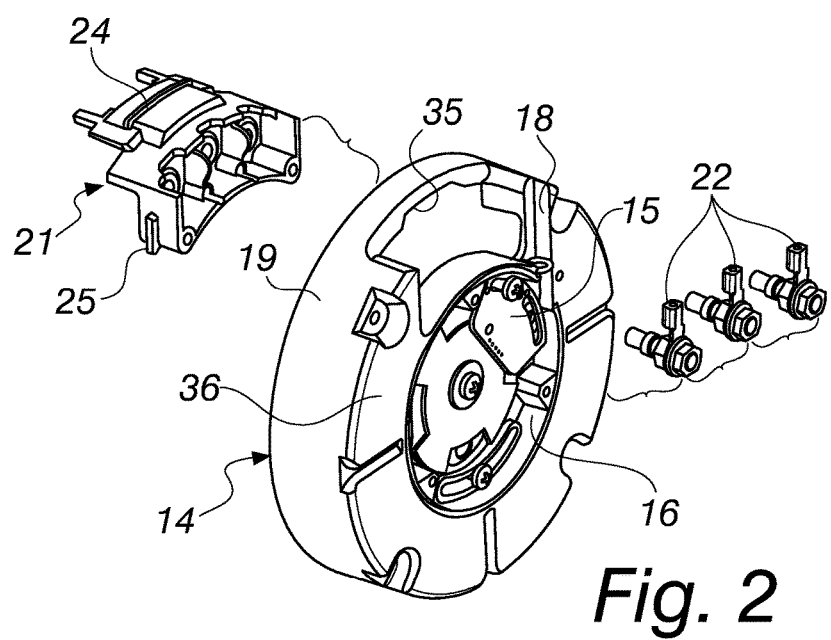
FIG. 2 is an exploded perspective view of a cap of the brushless motor according to the disclosure.

With reference to the figures, a brushless motor according to the disclosure is designated generally by the reference numeral 10.

This brushless motor comprises a casing 11 for containing a stator body and for a rotor with a driving shaft 12, an exit cap 13 with an outlet for the driving shaft 12 and a closure cap 14, which is opposite the exit cap 13.

The cap 14 supports an electronic board 15 for controlling the brushless motor, for example an encoder.

The cap 14 also comprises an output for power cables.

The particularity of the brushless motor 10 according to the disclosure resides in that the closure cap 14 has a recess 16 for containing the electronic control board 15, which is defined so as to be recessed in an axial direction X with respect to the outer surface 17 of the cap 14.

In particular, in the present constructive example, the recess 16 is constituted by a hollow having a circular profile that is extended in an axial direction toward the inside of the brushless motor 10 for such a depth that the electronic control board 15 is inserted entirely therein, and therefore the control board 15 does not cause any axial space occupation in addition to that of the set constituted by the casing 11, the exit cap 13 and the cap 14 when assembled.

Figure 7:
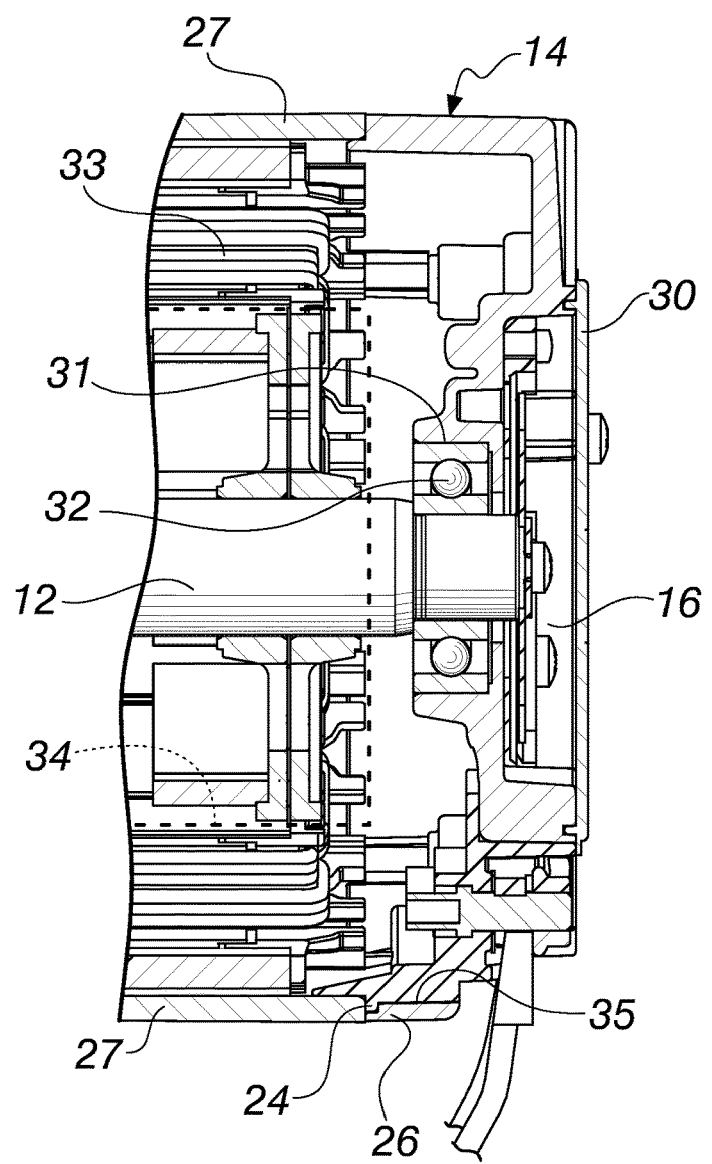
FIG. 7 is a detailed sectional side view of the brushless motor according to the disclosure.

The recess 16 is provided due to the axial movement, toward the inside of the brushless motor 10, of the position of a seat 31 of a bearing 32 that supports the driving shaft 12 on the side of the electronic control board 15, as clearly visible in FIG. 7.

The provision of this position of the seat 31 for the bearing 32 is made possible thanks to the fact that the rotor is axially less bulky than the stator, thus rendering usable the space that is axially adjacent to the lamination pack of the brushless motor.

FIG. 7 shows a stator winding 33 and the space occupation of the laminations 34 of which the rotor is composed.

Figure 8:
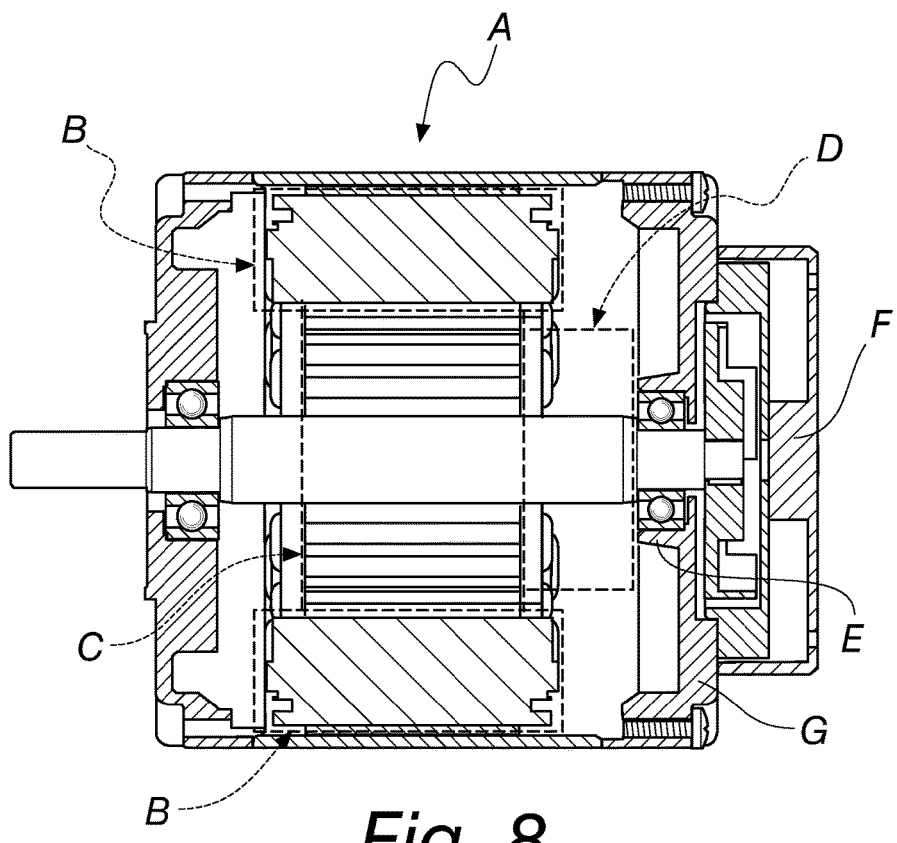
FIG. 8 is a schematic longitudinal sectional view of the brushless motor of a known type.

FIG. 8 is a schematic longitudinal sectional view of a brushless motor of a known type, designated generally by A, which highlights the space occupation B of the stator windings, the space occupation C of the rotor lamination pack, and the space D available between the rotor and the seat for the bearing E; it is clearly visible how in this known motor A there is a cap F for containment and protection of the encoder that is extended axially well beyond the space occupations of the closure cap G.

In the brushless motor 10 according to the disclosure, the bearing seat 31 has been moved so as to occupy part of the available space D indicated above of known motors, so as to be able to create in the closure cap 14 a space useful for inserting and protecting the encoder, i.e., the recess 16.

Moreover, the closure cap 14 has a channel 18 which lies between said recess 16 and the lateral surface 19 of the cap 14 and is preset to accommodate the passage of a power supply cable 20 for the electronic control board 15; the power supply cable 20 transmits both the power supply and the pulses/turn signal of the encoder.

Figure 4:
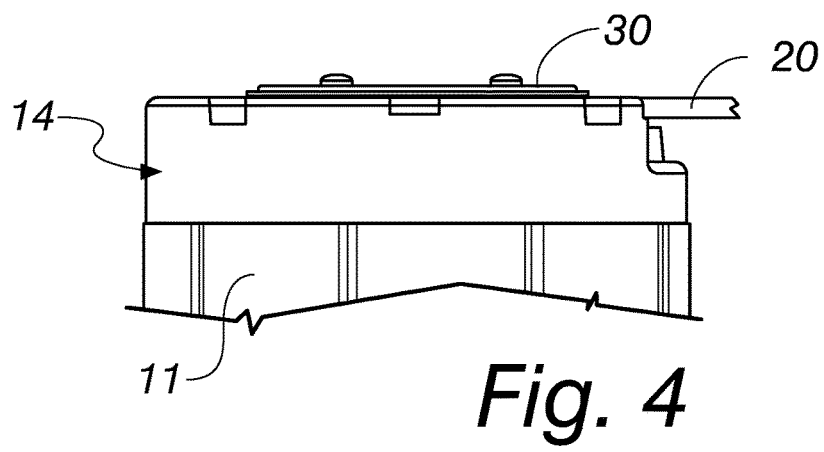
FIG. 4 is a side view of a portion of the brushless motor according to the disclosure.
Figure 5:
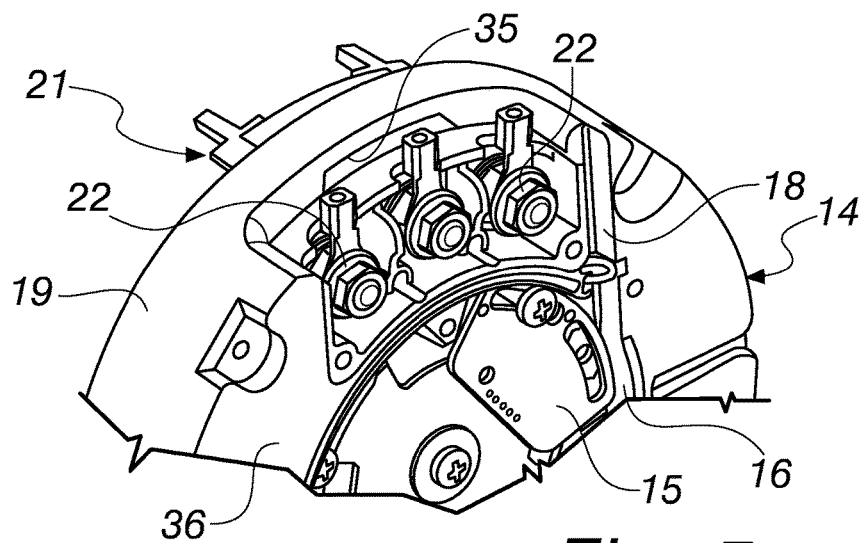
FIG. 5 is a perspective view of a portion of a cap of the brushless motor according to the disclosure.
Figure 6:
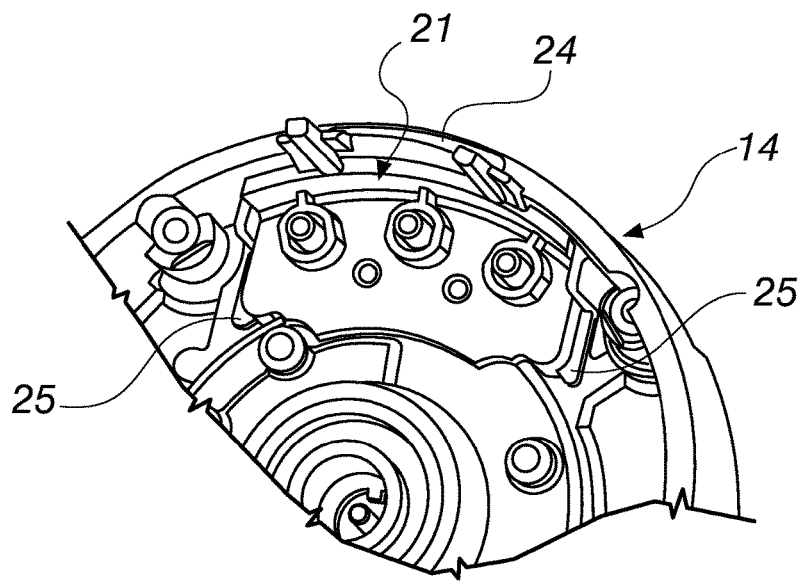
FIG. 6 is a further perspective view of the cap portion of FIG. 5.

In this manner, the brushless motor 10 is preset for the passage of the power supply cable 20 of the electronic control board 15 so that the power supply cable 20 can be arranged in two different manners according to the space occupation requirements:
power supply cable 20 in the axial direction, as in FIG. 1, if the radial space occupations must be contained,
power supply cable 20 exiting laterally by means of the channel 18, as in FIG. 4, if the space occupations in an axial direction must be contained.

The recess 16 is optionally closed by a plate-like cover 30, which is visible in the side views of FIG. 1 and FIG. 4 and is such as to not increase the axial space occupation of the brushless motor 10 according to the disclosure except by a few millimeters.

The closure cap 14 also has a seat 35 that is contoured to accommodate a terminal strip 21 preset for the wiring of the power cables of the brushless motor.

The seat 35 is open axially to allow direct access to the terminals 22 of said terminal strip 21 and radially for the lateral exit of the power cables.

The terminal strip 21 is contoured to stay within the axial and radial space occupations of the cap 14 in the respective outward directions of the brushless motor 10, so that it does not cause increases in space occupation in the two cited directions.

In the present constructive example, the seat 35 is arranged in a substantially perimetric region 36 of the cap 14.

The terminal strip 21 is provided with extraction-preventing lateral raised portions 24 and 25 preset to abut against corresponding internal abutment portions of the cap 14.

Figure 3:
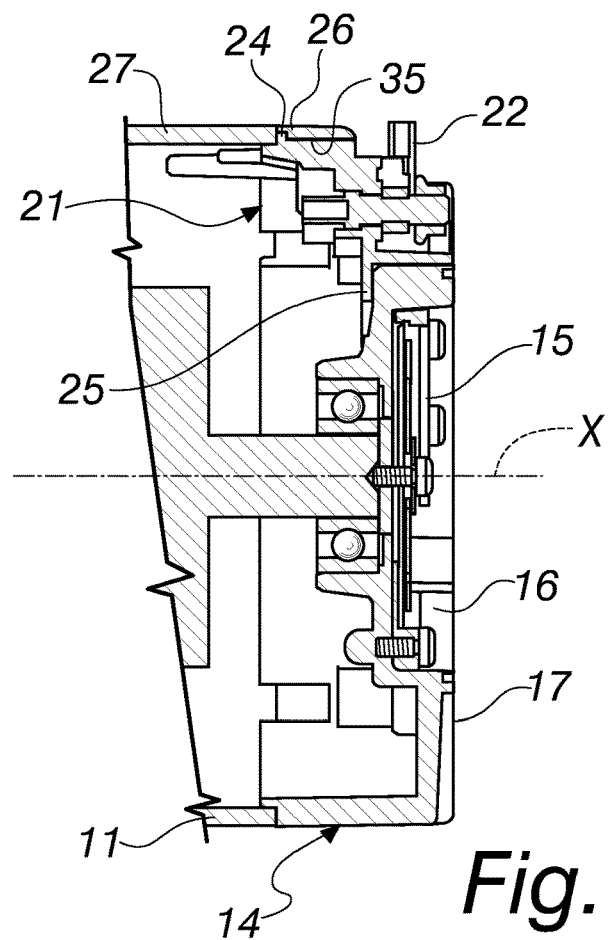
FIG. 3 is a schematic sectional side view of the brushless motor according to the disclosure.

In particular, the terminal strip 21 is locked in its seat 35 by means of perimetric extraction-preventing lateral raised portions 24, which are closed between a corresponding internal portion 26 for the abutment of the cap 14, as in FIG. 3, and a corresponding part 27 of the edge of the casing 11.

In this manner, the terminal strip 21 is assembled without resorting to threaded joining elements or other components or to adapted connecting operations, such as welding or gluing.

This solution with the terminal strip 21 locked between the casing 11 and the cap 14 allows faster and more economic assembly of the brushless motor 10.

Moreover, from the terminals 22 the power cables can be connected so as to extend in an axial direction or in a substantially radial direction, depending on whether it is preferable to limit radial or axial space occupations respectively.

The terminal strip 21 can be made of plastic material.

Figure 9:
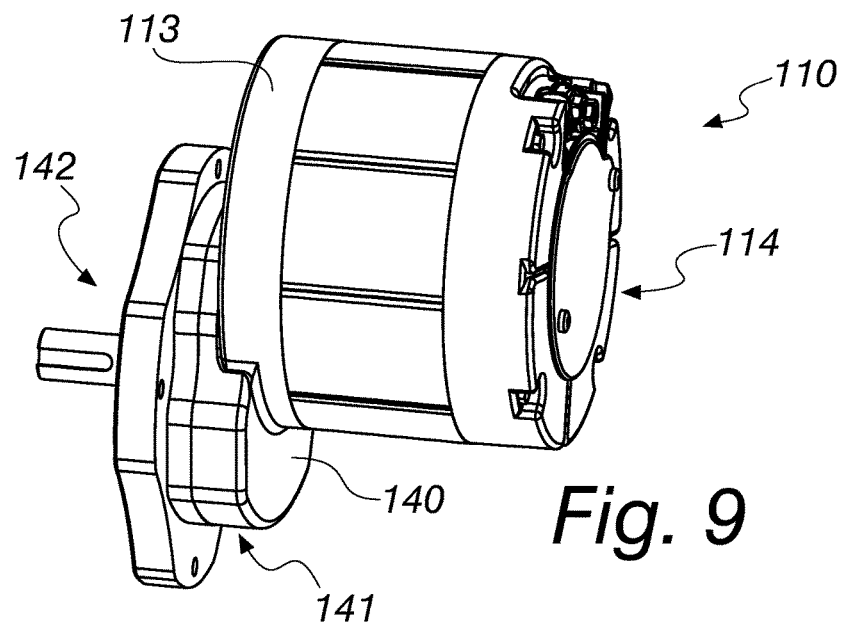
FIGS. 9 and 10 are views of a first example of application of the brushless motor according to the disclosure.
Figure 10:
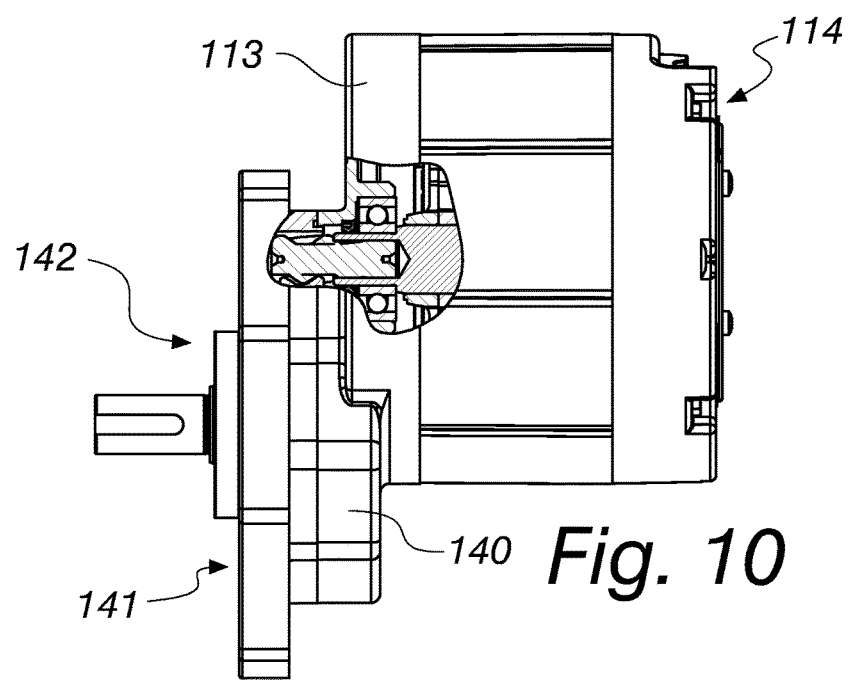

FIGS. 9 and 10 are views of a first example of application of a brushless motor according to the disclosure, designated therein by the numeral 110, with a closure cap 114 as described above.

In this example of application, the exit cap 113 is integrated with a portion 140 of a case 141 of a reduction unit 142.

Figure 11:
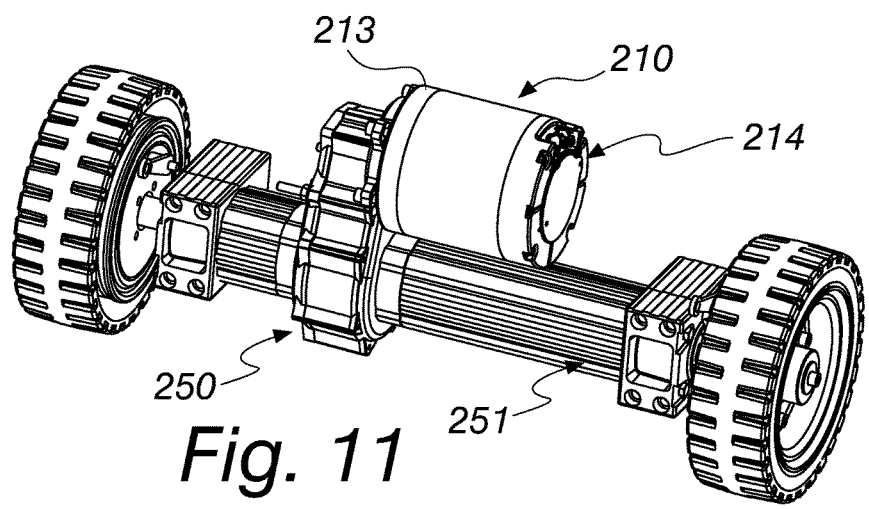
FIG. 11 is a view of a second example of application of the brushless motor according to the disclosure.

FIG. 11 shows a second example of application of a brushless motor according to the disclosure, designated therein by the numeral 210, with a closure cap 214 as described above.

In this example of application, the exit cap 213 is fixed to a differential unit 250 of an axle 251 of a vehicle, actuated by the driving shaft of the brushless motor 210.

Figure 12:
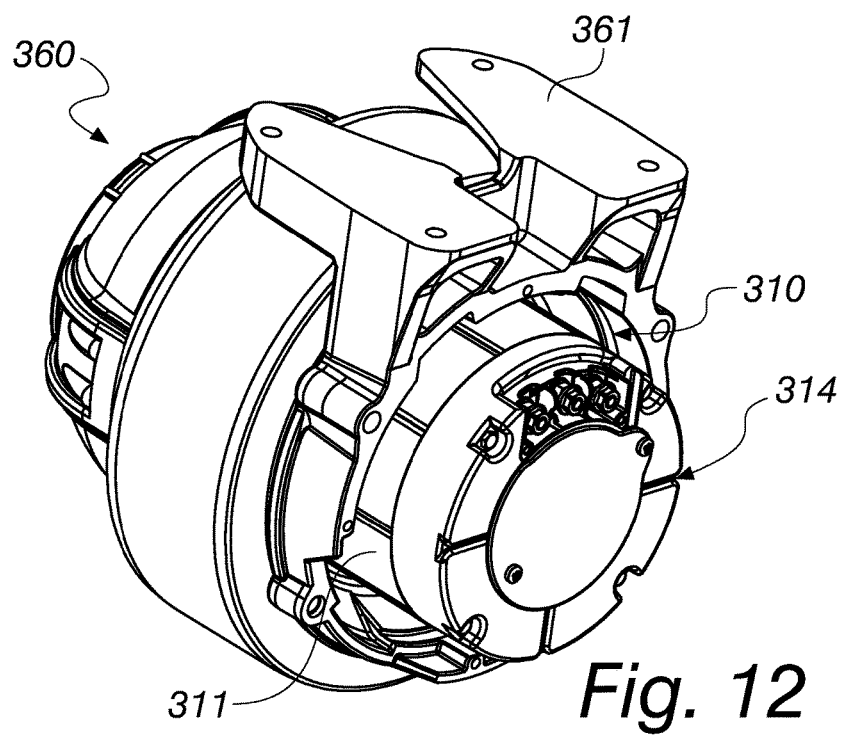
FIGS. 12 and 13 are views of a third example of application of the brushless motor according to the disclosure.
Figure 13:
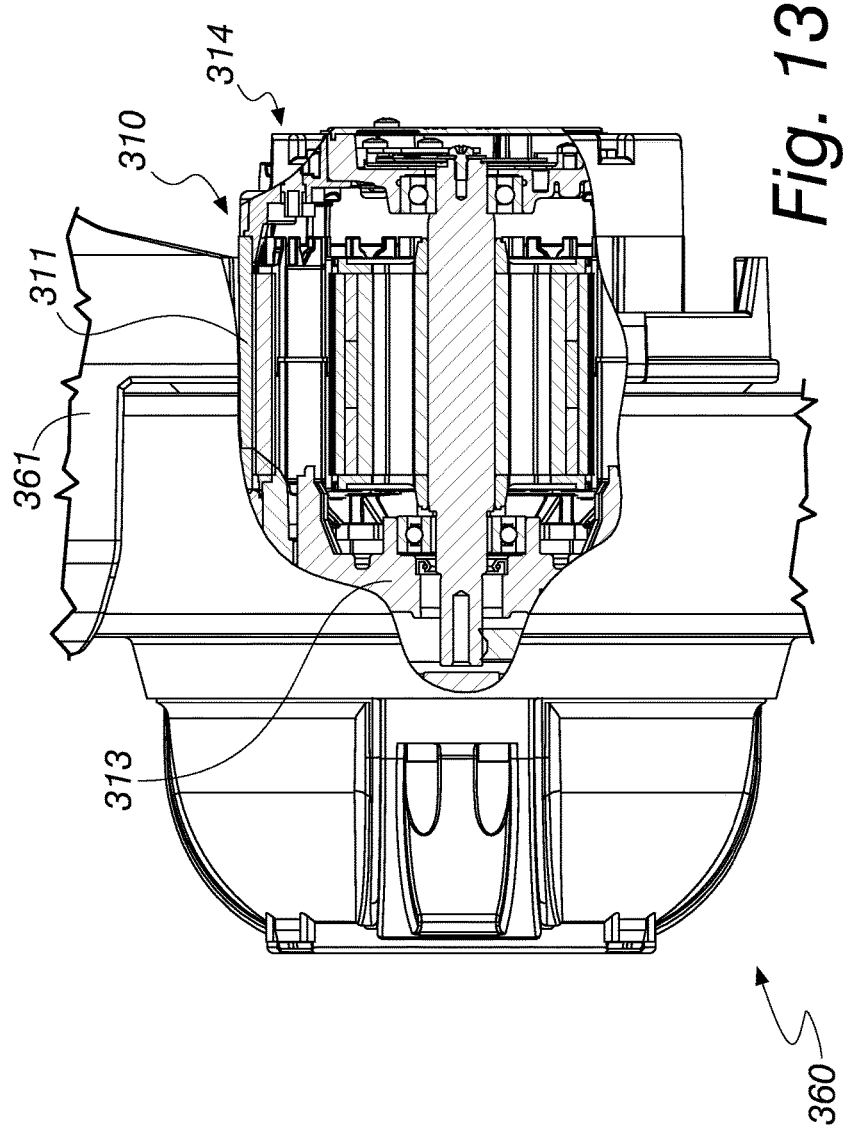

FIGS. 12 and 13 show a third example of application of a brushless motor according to the disclosure, designated therein by the numeral 310, with a closure cap 314.

In this example of application, the brushless motor 310 is integrated in a wheel drive 360, with exit cap 313 and casing 311 supported by a bracket 361 for fixing to a transport of which said wheel drive 360 is part.

Therefore, it is to be understood that the patent also relates to a brushless motor 110, 210 and 310, the exit cap 113, 213 and 313 of which has only partially, and not exclusively, the function of closing said brushless motor, or has the function of closing partially and not completely said brushless motor.

It is understood that the disclosure also relates to a brushless motor 10, comprising a casing 11 for containing a stator body and a rotor with a driving shaft 12, an exit cap 13 with an outlet for the driving shaft 12 and a closure cap 14, which is opposite the exit cap 13 and supports an electronic board 15 for controlling the brushless motor and comprises an output for power cables, the particularity of which resides in that the closure cap 14 has a seat 35 that is contoured to accommodate a terminal strip 21 that is preset for the wiring of the power cables of the brushless motor, the terminal strip 21 being locked in its seat 35 by means of perimetric extraction-preventing lateral raised portions 24, which are closed between a corresponding internal portion 26 for the abutment of the cap 14 and a corresponding part 27 of the edge of the casing 11.

In practice it has been found that the disclosure achieves the intended aim and objects.

In particular, the disclosure has provided a brushless motor capable of combining compactness and ease of access to the electronic control board, by means of the specifically provided recess defined on the cap and extended toward the inside of the brushless motor in an axial direction; said recess allows immediate access and so does the electronic control board, encoder, contained therein.

Moreover, the disclosure has provided a brushless motor that is easier to assemble than the known brushless motors cited above, by means of both the recess for the encoder and the terminal strip that is simply locked between the cap and the casing without resorting to threaded joining elements or other fixing system.

Moreover, the disclosure has provided a brushless motor with a capacity and efficiency that are not lower than similar brushless motors of the known type.

The disclosure thus conceived is susceptible of numerous modifications and variations, all of which are within the scope of the appended claims; moreover, all the details may be replaced with other technically equivalent elements.

In practice, the materials used, so long as they are compatible with the specific use, as well as the contingent shapes and dimensions, may be any according to requirements and to the state of the art.

The disclosures in Italian Patent Application No. PD2014A000163 from which this application claims priority are incorporated herein by reference.

What is claimed is:

1. A brushless motor, comprising a casing for containing a stator body and for a rotor with a driving shaft, an exit cap with an outlet for said driving shaft and a closure cap, the closure cap being disposed opposite said exit cap and supports an electronic board for controlling the brushless motor, wherein the closure cap includes an output for power cables and a recess for containing said electronic control board, which is defined so as to be recessed in an axial direction with respect to the outer surface of said closure cap and thereby being open outwardly with respect to the casing that contains the stator body, said closure cap having a seat that is contoured to accommodate a terminal strip preset for the wiring of the power cables of the brushless motor, said seat being open axially to allow direct access to the terminals of said terminal strip and radially for the lateral exit of the power cables, wherein said recess is constituted by a hollow having a circular profile that is extended in an axial direction toward the inside of said brushless motor for such a depth that said electronic control board is inserted entirely therein.

2. The motor according to claim 1, wherein said closure cap is provided with a channel which lies between said recess and the lateral surface of said cap, wherein the channel is preset to accommodate the passage of a power supply cable for said electronic control board.

3. The motor according to claim 1, wherein said terminal strip is contoured to stay within an axial and radial space occupation of the cap in respective outward directions of said brushless motor.

4. The motor according to claim 1, wherein said seat is arranged in a substantially perimetric region of said cap.

5. The motor according to claim 1, wherein said terminal strip is provided with extraction-preventing lateral raised portions preset to abut against corresponding internal abutment portions of said cap.

6. The motor according to claim 1, wherein said terminal strip is locked in its seat by means of perimetric extraction-preventing lateral raised portions, which are closed between a corresponding internal portion for the abutment of said cap and a corresponding part of the edge of the casing.

7. A brushless motor, comprising a casing for the containment of a stator body and a rotor with a driving shaft, an exit cap with an outlet for said driving shaft, and a closure cap, the closure cap being disposed opposite said exit cap and is provided, in a recess open outwardly with respect to the casing that contains the stator body, with an electronic control board of the brushless motor, and wherein the closure cap includes an outlet for power cables and a seat that is contoured to accommodate a terminal strip that is preset for the wiring of the power cables of the brushless motor, said terminal strip being locked in its seat by means of perimetric extraction-preventing lateral raised portions, which are closed between a corresponding internal portion for the abutment of said closure cap and a corresponding part of the edge of the casing, wherein said recess is constituted by a hollow having a circular profile that is extended in an axial direction toward the inside of said brushless motor for such a depth that said electronic control board is inserted entirely therein.

* * * * *